United States Patent
Puvvada et al.

(10) Patent No.: US 10,747,757 B1
(45) Date of Patent: Aug. 18, 2020

(54) GRAPHICAL QUERY BUILDER FOR MULTI-MODAL SEARCH

(71) Applicant: ServiceNow, Inc., Santa Clara, CA (US)

(72) Inventors: Madhavi Puvvada, Sammamish, WA (US); Sreenevas Subramaniam, Dublin, CA (US); Brandon Thomas Trudel, Bellevue, WA (US); Akshay Patekar, Redmond, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/402,085

(22) Filed: May 2, 2019

(51) Int. Cl.
*G06F 3/0482* (2013.01)
*G06F 16/242* (2019.01)
*G06F 16/22* (2019.01)
*G06F 3/0483* (2013.01)
*G06F 3/0486* (2013.01)

(52) U.S. Cl.
CPC ........ *G06F 16/2428* (2019.01); *G06F 3/0482* (2013.01); *G06F 3/0483* (2013.01); *G06F 16/2282* (2019.01); *G06F 3/0486* (2013.01)

(58) Field of Classification Search
CPC ... G06F 16/2282; G06F 3/0482; G06F 3/0483
See application file for complete search history.

(56) References Cited

U.S. PATENT DOCUMENTS

| | | | |
|---|---|---|---|
| 5,978,594 A | 11/1999 | Bonnell | |
| 6,353,830 B1 | 3/2002 | Yee et al. | |
| 6,816,898 B1 | 11/2004 | Scarpelli | |
| 6,895,586 B1 | 5/2005 | Brasher et al. | |
| 7,027,411 B1 | 4/2006 | Pulsipher | |
| 7,392,300 B2 | 6/2008 | Anantharangachar | |
| 7,617,073 B2 * | 11/2009 | Trinon | G06F 11/008 702/183 |
| 7,877,783 B1 | 1/2011 | Cline | |
| 7,945,860 B2 | 5/2011 | Vambenepe | |
| 8,055,672 B2 | 11/2011 | Djugash et al. | |
| 8,554,750 B2 | 10/2013 | Rangaranjan | |

(Continued)

OTHER PUBLICATIONS

"London Platform Capabilities", ServiceNow Documentation, Mar. 23, 2019, 25 pages.

*Primary Examiner* — Anil K Bhargava
(74) *Attorney, Agent, or Firm* — Fletcher Yoder PC

(57) ABSTRACT

A system may involve persistent storage containing a configuration management database (CMDB) and a non-CMDB table, wherein the CMDB contains configuration items that represent software, devices, or services deployed within a network, and wherein the non-CMDB table contains entries related to operation of the network. The system may also involve one or more processors configured to provide a representation of a graphical user interface (GUI), wherein the GUI contains a first selectable tab that displays classes of the configuration items, a second selectable tab that displays the non-CMDB table, and a canvas for visually depicting query expressions, wherein the classes are selectable to place class GUI elements thereof onto the canvas, wherein the non-CMDB table is selectable to place a table GUI element thereof onto the canvas, and wherein the table GUI element and a particular class GUI element are connectable by a link on the canvas.

20 Claims, 17 Drawing Sheets

(56) References Cited

U.S. PATENT DOCUMENTS

| | | | | |
|---|---|---|---|---|
| 9,467,344 | B2* | 10/2016 | Gere | G06F 3/0482 |
| 2005/0004911 | A1* | 1/2005 | Goldberg | G06F 16/2428 |
| 2005/0015363 | A1* | 1/2005 | Dessloch | G06F 16/2428 |
| 2005/0278286 | A1* | 12/2005 | Djugash | G06F 16/248 |
| 2007/0027845 | A1* | 2/2007 | Dettinger | G06F 16/24578 |
| 2008/0134286 | A1* | 6/2008 | Amdur | H04L 63/20 726/1 |
| 2008/0256056 | A1* | 10/2008 | Chang | G06Q 30/0244 |
| 2010/0161646 | A1* | 6/2010 | Ceballos | G06F 16/2428 707/769 |
| 2011/0238691 | A1* | 9/2011 | Gere | H04L 41/0856 707/769 |
| 2012/0226717 | A1* | 9/2012 | Maheshwari | G06F 16/248 707/798 |
| 2015/0161240 | A1* | 6/2015 | Rebbapragada | G06F 16/2428 707/740 |
| 2019/0196890 | A1* | 6/2019 | Bucchi | G06F 16/24545 |

* cited by examiner

Query Results

| ☐ Call manager | Call manager / Incident type | Incidents |
|---|---|---|
| ☐ MyPhone | Application service reference | INC1134141 |
| ☐ MyPhone | Application service reference | INC1134149 |
| ☐ ABC Messenger | Application service reference | INC1134157 |

▸ Actions on selected rows   |   10 rows per page   ▽  [1]  △   to 1 of 1

GRAPHICAL QUERY BUILDER FOR MULTI-MODAL SEARCH

BACKGROUND

Remote network management platforms may enable discovery, manipulation, and orchestration of devices, applications, and services on various types of private or public networks. Such a remote network management platform may store configuration items (also referred to as "CIs") describing and/or relating to these devices, applications, and services in a configuration management database (CMDB) for example. Each configuration item can contain a number of attributes, such as a name, manufacturer, location, serial number, class, and so on. The class of a configuration item may determine the types of attributes that the configuration item contains.

The CMDB may support search operations in which a user can enter values of one or more configuration item attributes, and the CMDB may return a list of configuration items that have attributes with these values. But existing search functions may be unable to scale to the extent desired as the number of configuration items in the CMDB grows and/or the role that the remote network management platform takes on expands. For example, to find a particular list of configuration items, the user might be required to enter a very specific search query. Otherwise the query results may be quite long, requiring extensive manual review. In some cases, such a CMDB-centered search capability might not be able to narrow the number of configuration items returned.

SUMMARY

A large managed network may have tens or hundreds of thousands of configuration items represented in its CMDB. The scale of this information may make the CMDB difficult to search. For instance, if a user seeks to determine the operational status of all configuration items related to a particular reported incident (e.g., a network outage), the user may have to first determine the service(s) to which the incident relates and then determine the configuration items employed by these service(s). This could require that the user come up with a complicated Boolean, numerical, and/or algebraic query expression, if it is even possible to carry out the search with just CMDB data.

A remote network management platform may also store additional information (in tables of the CMDB or in tables in one or more other databases) representing further operational aspects of the managed network in so-called non-CMDB tables. This additional information may relate to the aforementioned incidents (reported technical issues or difficulties related to the managed network), as well as alerts (events generated by the remote network management platform that are considered to be important and may require attention), changes (addition, modification, or removal of configuration items), people (individual users with access to the remote network management platform), problems (the underlying causes of one or more incidents), and tasks (units of work to be carried out).

In many cases, users may wish to search across these databases and/or tables. While doing so allows for much more powerful query expressions to be formed and searched, this capability can be challenging for users (especially non-technical users) to employ. A proper query expression needs to refer to the right databases, tables, and attributes/fields. Further, this query expression would also have to include the proper Boolean, numerical, and/or algebraic operators in the proper order. Even experienced users can have difficulties forming such complex expressions.

In the embodiments described herein, a graphical user interface (GUI) is introduced that allows users to graphically form search queries for multi-database and/or multi-table searches. By building these multi-modal search queries in a visual fashion, even non-technical users can successfully perform complex searches. Further, the overhead-related load on the remote network management platform may be reduced, as users are less likely to have to experiment with search queries until they find the right combination of parameters.

Accordingly, a first example embodiment may involve persistent storage containing a CMDB and a non-CMDB table, where the CMDB contains configuration items that represent software, devices, or services deployed within a network, and where the non-CMDB table contains entries related to operation of the network. The first example embodiment may also involve one or more processors configured to provide, to a client device associated with the network, a representation of a GUI. The GUI may contain a first selectable tab that displays classes of the configuration items, a second selectable tab that displays the non-CMDB table, and a canvas for visually depicting query expressions. The classes may be selectable, when displayed and by way of the GUI, to place class GUI elements thereof onto the canvas. The non-CMDB table may be selectable, when displayed and by way of the GUI, to place a table GUI element thereof onto the canvas. The table GUI element and a particular class GUI element of the class GUI elements may be connectable by a link on the canvas when displayed thereon. The link may represent one or more columns in the non-CMDB table that can reference configuration items associated with a particular class corresponding to the particular class GUI element.

A second example embodiment may involve displaying a representation of a GUI by way of a computing system, where the computing system has access to persistent storage containing a CMDB and a non-CMDB table, where the CMDB contains configuration items that represent software, devices, or services deployed within a network, where the non-CMDB table contains entries related to operation of the network, and where the GUI includes a first selectable tab, a second selectable tab, and a canvas. The second example embodiment may also involve receiving, by way of the GUI, a first indication that the first selectable tab has been selected, and responsively displaying selectable classes of the configuration items on the GUI. The second example embodiment may also involve receiving, by way of the GUI, a second indication that a particular class of the selectable classes has been selected, and responsively placing a particular class GUI element corresponding to the particular class on the GUI. The second example embodiment may also involve receiving, by way of the GUI, a third indication that the second selectable tab has been selected, and responsively displaying the non-CMDB table on the GUI. The second example embodiment may also involve receiving, by way of the GUI, a fourth indication that the non-CMDB table has been selected, and responsively placing a table GUI element corresponding to the non-CMDB table on the GUI. The second example embodiment may also involve receiving, by way of the GUI, a fifth indication that the particular class GUI element and table GUI element are connected, and responsively connecting the particular class GUI element and the table GUI element on the GUI with a link, where the link represents one or more columns in the non-CMDB table that can reference configuration items associated with the particular class, and where the particular class GUI element, the table GUI element, and the link are a visual depiction of a query expression.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6G depicts a search query results graphical user interface, in accordance with example embodiments.

DETAILED DESCRIPTION

Figure 1:
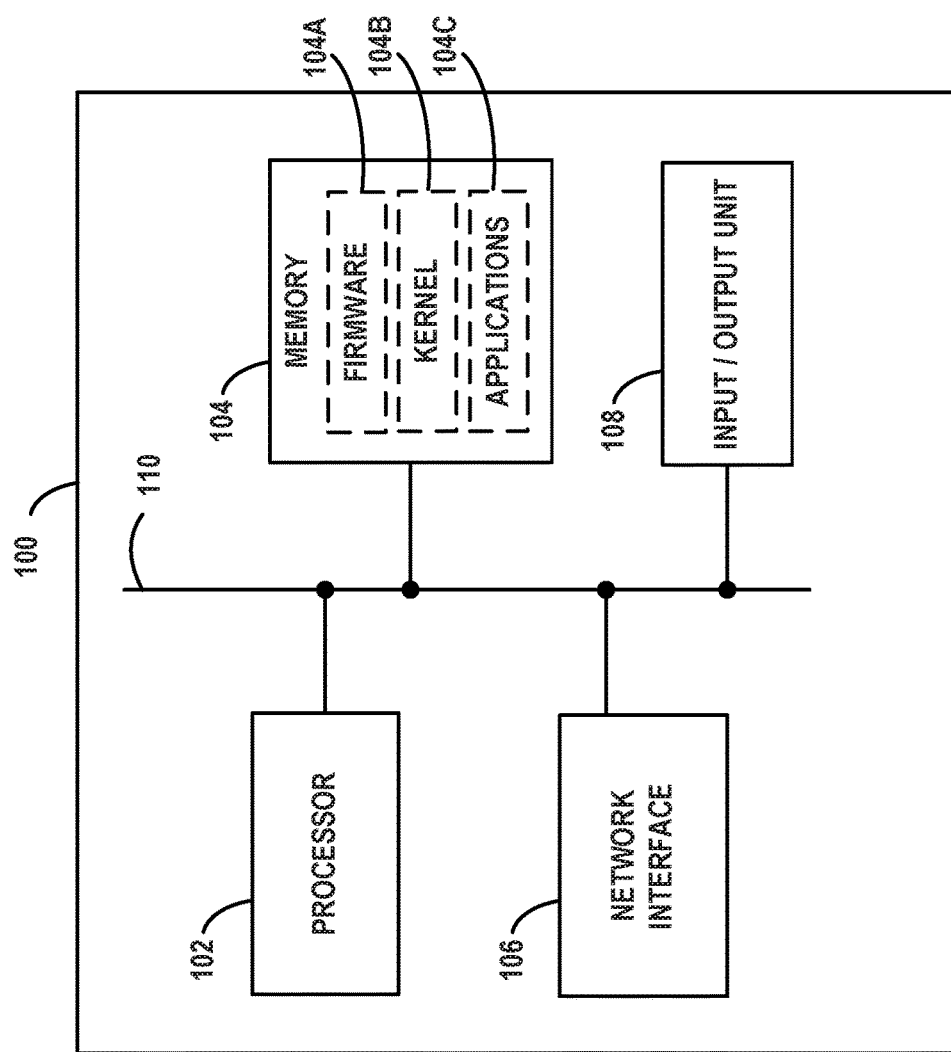
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
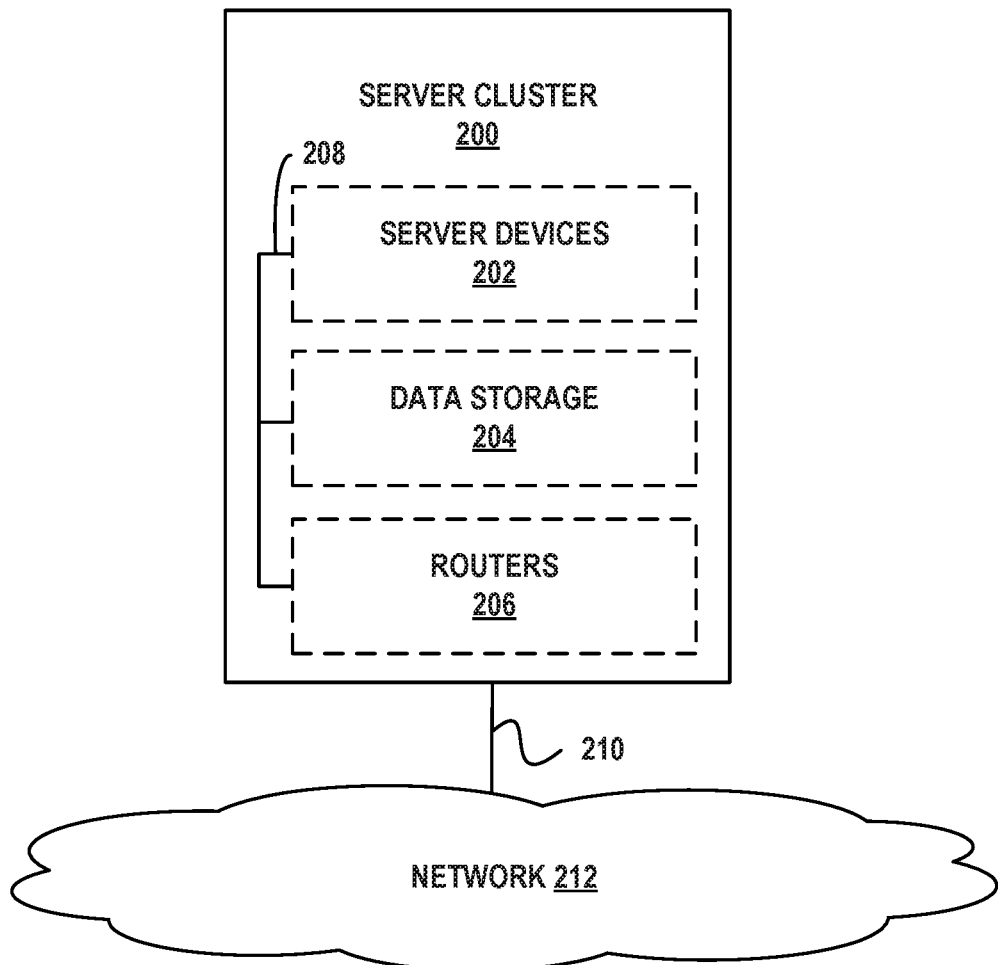
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
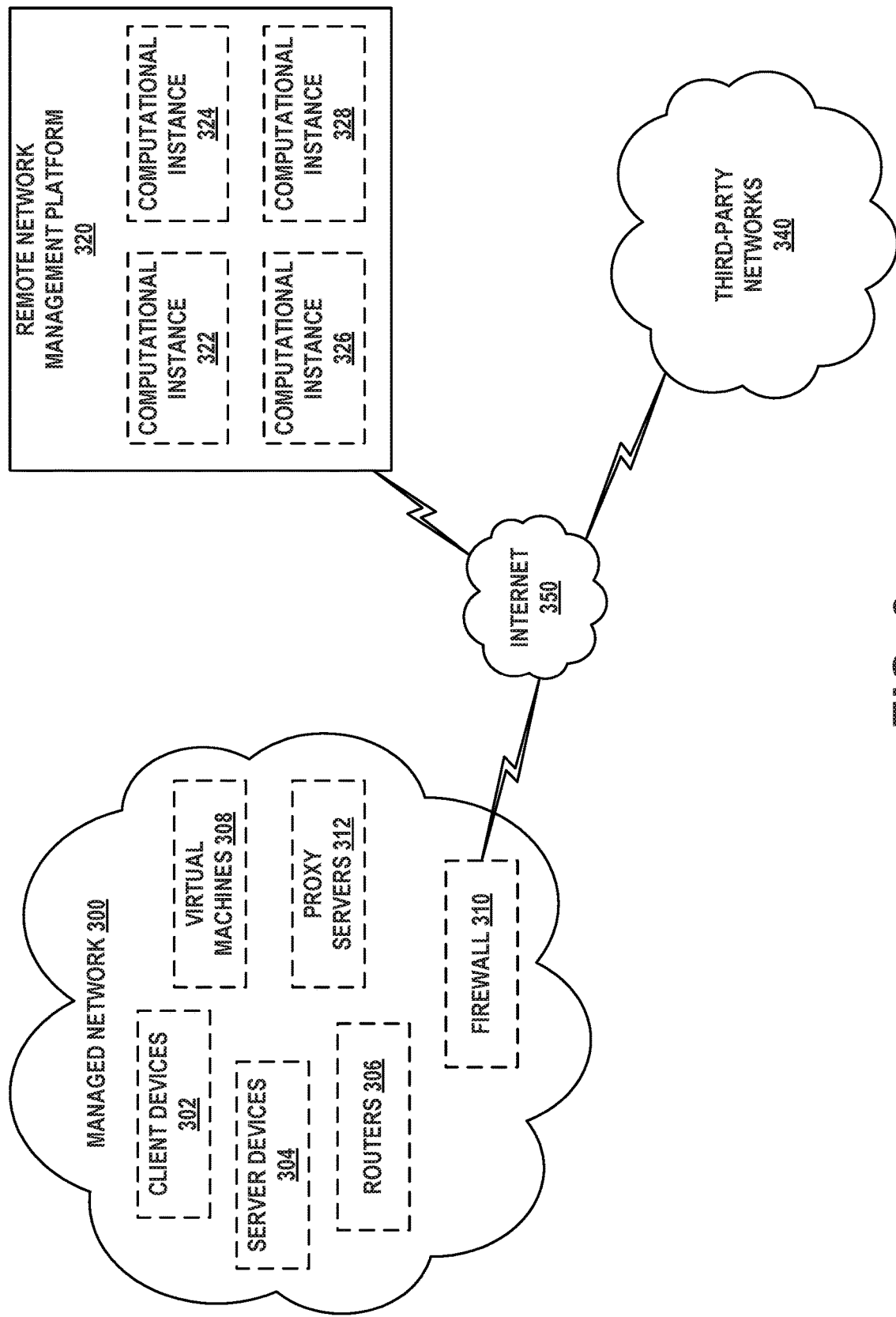
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
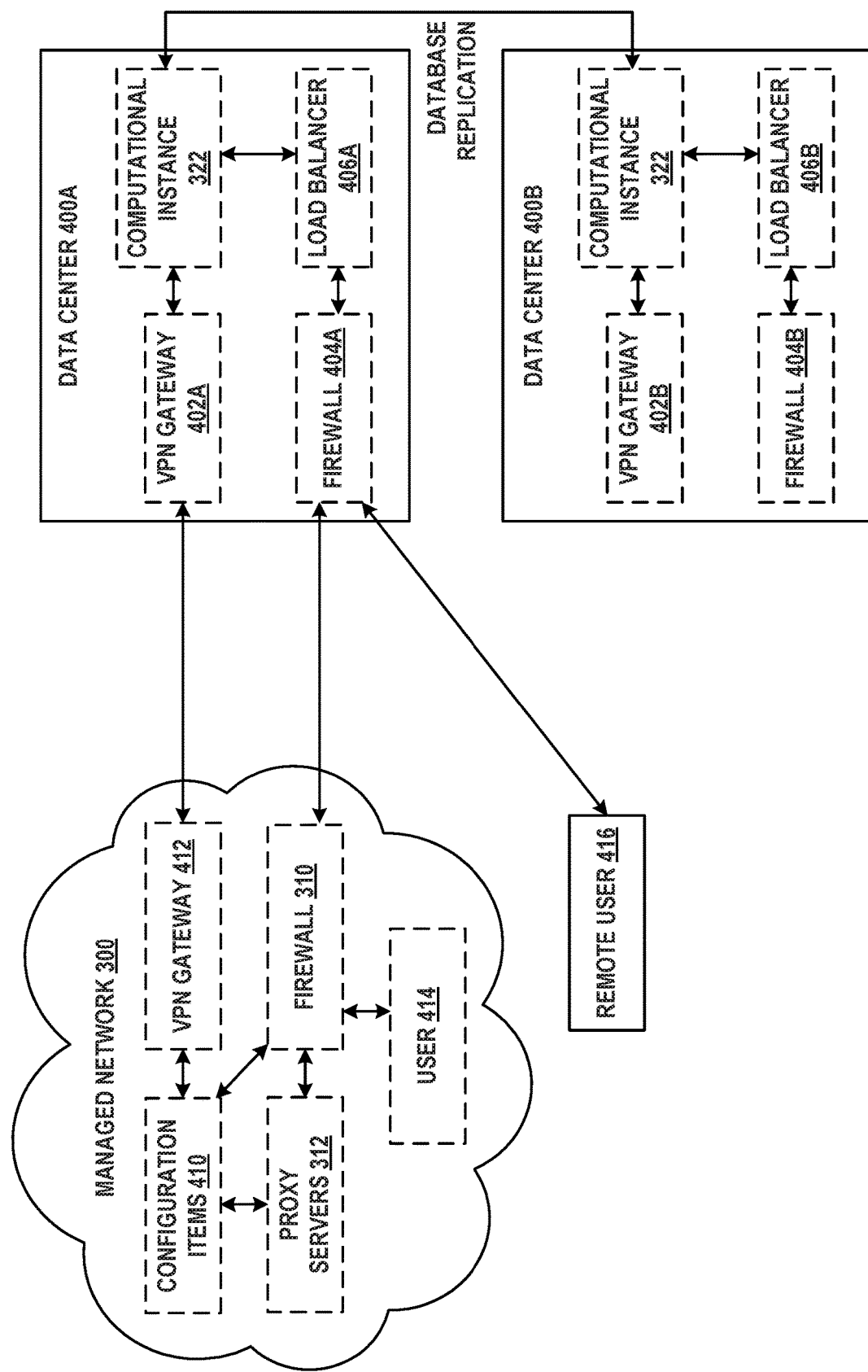
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
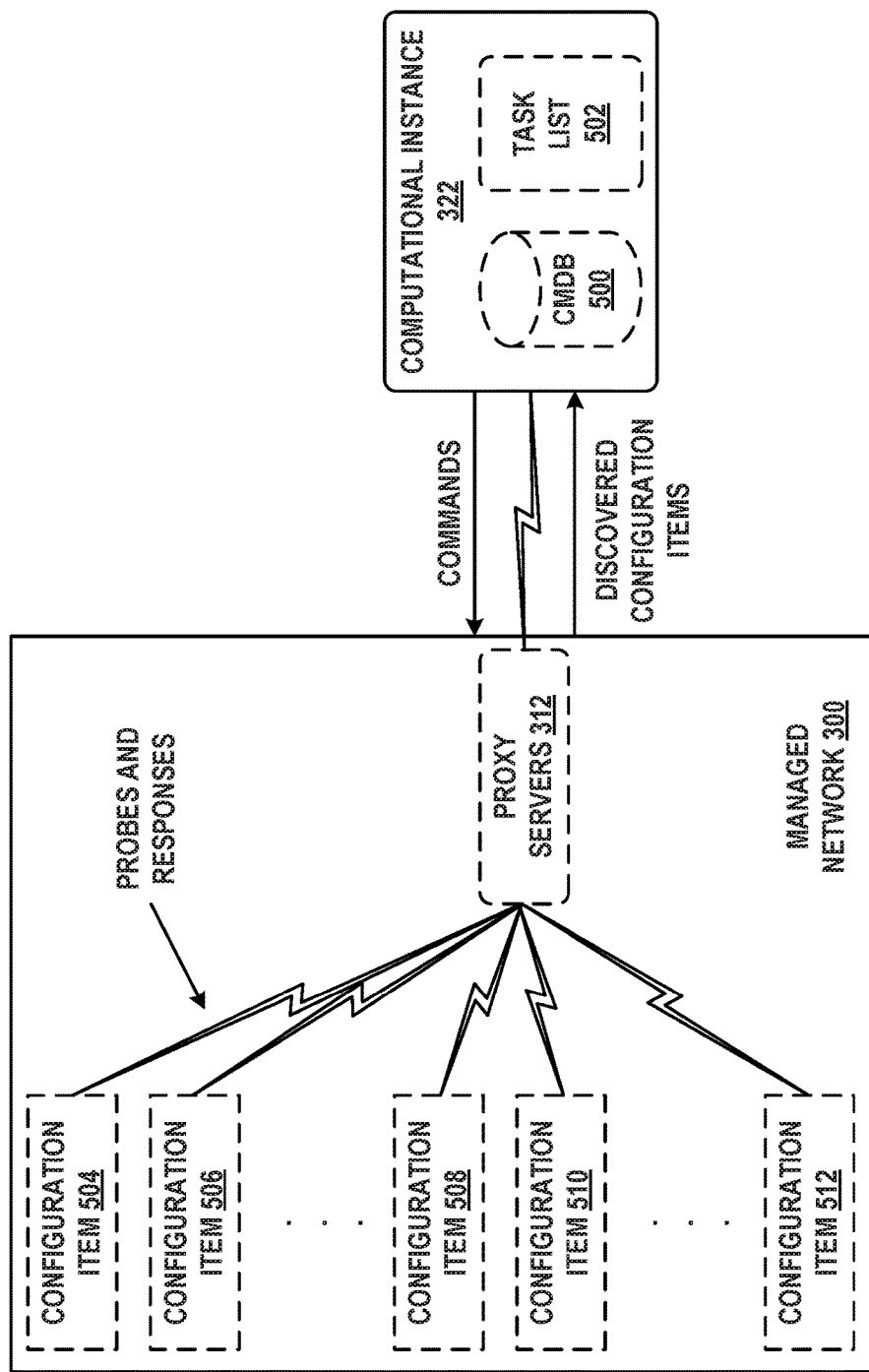
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
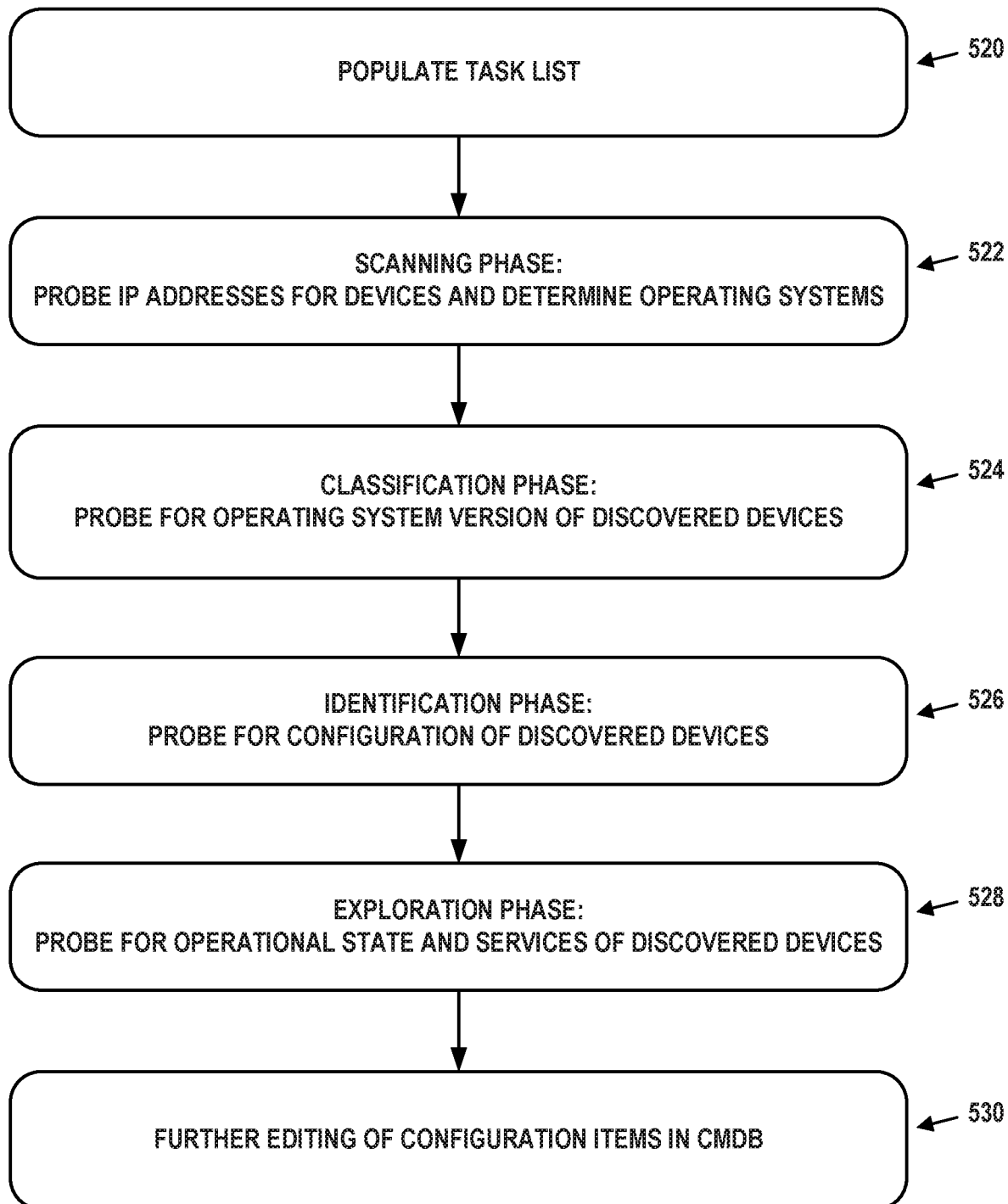
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Search Query Builder User Interface

As noted previously, users can easily become confused and overwhelmed when attempting to develop search queries that span multiple tables and/or databases stored within a computational instance of a remote network management platform. The embodiments herein address these issues by providing a guided search query builder in the form of a series of GUIs. Alternatively, a single such GUI may provide analogous functionality by way of one or more tabs, panes or other GUI elements.

The embodiments herein may represent a GUI in various ways. For example, a server device may generate a representation of a GUI using a combination of HTML and JAVASCRIPT®, for example. The JAVASCRIPT® may include client-side side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

Figure 6A:
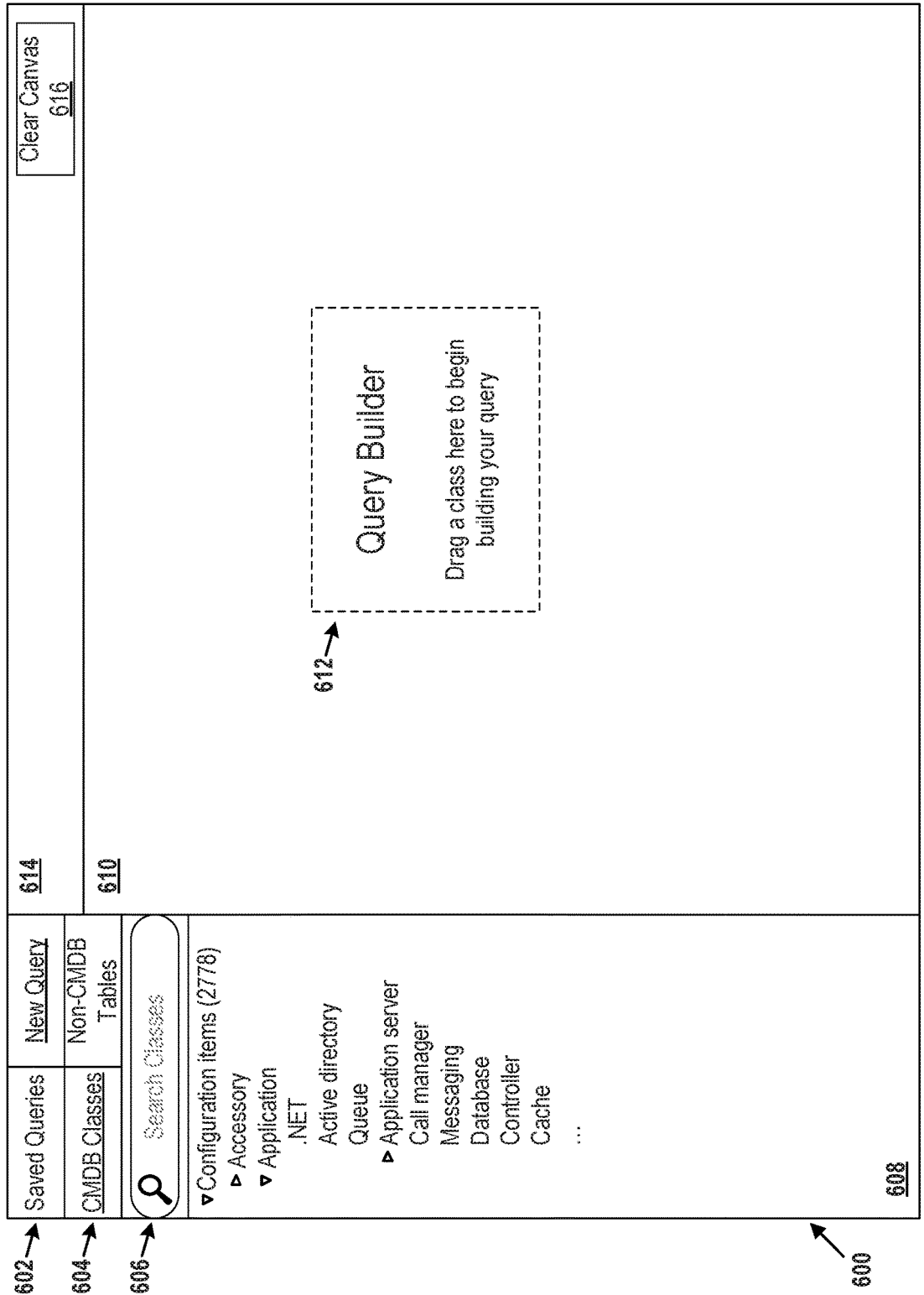
FIG. 6A depicts a search query builder graphical user interface, in accordance with example embodiments.

FIG. 6A depicts a search query builder GUI 600 containing tabs 602, sub-tabs 604, search box 606, menu pane 608, search query canvas 610, and control pane 614. Other content and arrangements thereof in GUI 600 may be possible.

Tabs 602 are selectable to control options for displaying sub-tabs 604, and possibly search box 606 and menu pane 608 as well. In FIG. 6A, tabs 602 have two options—saved queries and new query.

When selected, the saved queries option may display (perhaps in place of sub-tabs 604, search box 606, and/or menu pane 608) a list of pre-defined, pre-existing, and/or user-defined search queries. While not shown in the figures, a user may be able to select one of these saved queries, which may result in a graphical representation of the search query being displayed in canvas 610 for editing or execution.

When selected, the new query option displays what is shown in FIG. 6A as well as some of the following figures. In particular, sub-tabs 604, search box 606, and menu pane 608 allow user definition of a search query. The new query option is underlined to indicate that it has been selected.

Sub-tabs 604 are selectable controls that present two further options—CMDB classes and non-CMDB tables. In FIG. 6A, the CMDB classes option is underlined to indicate that it has been selected.

When selected, the CMDB classes option may display a list of configuration item classes from the CMDB in menu pane 608. As noted above, each configuration item may be of one such class, and these classes may map to database tables in the CMDB (e.g., in a one-to-one relationship between classes and tables). As shown, the list of configuration item classes is hierarchical and alphabetized, with drop-down arrows allowing sub-lists to be expanded and collapsed. For instance, the accessory and application server classes are collapsed, while the application list is expanded. Nonetheless, other arrangements and listings are possible. Notably, the list of configuration item classes in menu pane 608 is truncated, and dozens or hundreds of classes may be present.

Search box 606 allows user entry of text strings. Doing so may cause the list of configuration item classes to be filtered accordingly. For instance, entering the text string "app" into search box 606 may cause menu pane 608 to display only classes with names containing that string—namely, the application and application server classes.

Canvas 610 is the substrate upon which graphical search queries can be represented and edited. As such, canvas 610 is the largest portion of GUI 600. Nonetheless, in certain embodiments, canvas 610 may be of various sizes relative to other parts of GUI 600. In FIG. 6A, canvas 610 contains helper text 612. The latter is a temporary popup window or overlay that informs the user that he or she can drag classes displayed in menu pane 608 to canvas 610 in order to graphically build a search query.

Control pane 614 displays one or more buttons or other GUI elements that mediate the user's interaction with canvas 610 and any search query represented thereon. In FIG. 6A, control pane 614 only displays clear canvas button 616. Other figures provide more detail about additional buttons and/or functions that may be provided by way of control pane 614.

Figure 6B:
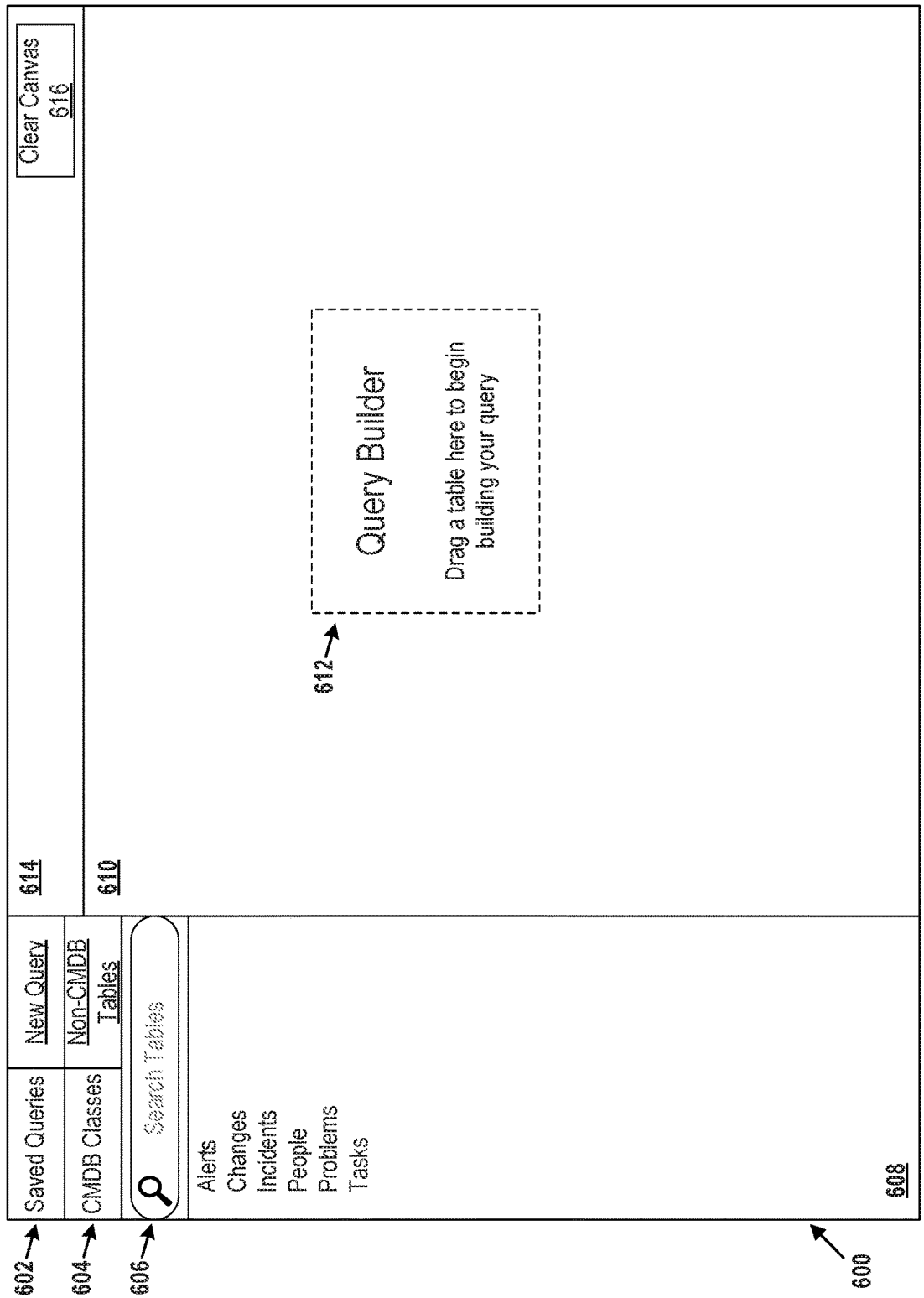
FIG. 6B depicts another search query builder graphical user interface, in accordance with example embodiments.

FIG. 6B depicts GUI 600 largely in the same configuration as FIG. 6A, but with non-CMDB tables selected in sub-tabs 604 (as indicated by underlining). Accordingly, menu pane 608 displays a list of non-CMDB tables available for searching. Each of these tables represents operational aspects of a managed network that can be organized by way of one or more database tables in a computational instance assigned to that managed network.

As shown in FIG. 6B, the non-CMDB tables may include tables for alerts (events generated by the computational instance that are considered to be important and may require attention), changes (addition, modification, or removal of configuration items), incidents (reported technical issues or difficulties related to the managed network or the computational instance), people (individual users with access to the computational instance), problems (the underlying causes of one or more incidents), and tasks (a unit of work to be carried out). Other such tables may exist. Further, the number of non-CMDB tables used by a particular computational instance may vary.

In various embodiments, non-CMDB tables may be disposed within the same database or computing device, or across two or more databases or computing devices. In some cases, non-CMDB tables may be disposed within the same database as the CMDB and its associated tables.

Search box 606 is also displayed, and still allows user entry of text strings. But in this context, doing so causes the list of non-CMDB tables to be filtered accordingly. For instance, entering the text string "alert" into search box 606 may cause menu pane 608 to display only the alerts non-CMDB table.

Not unlike the classes of FIG. 6A, GUI 600 as displayed in FIG. 6B allows the user to drag one or more of the non-CMDB tables displayed in menu pane 608 to canvas 610 in order to graphically build a search query. This ability is described in helper text 612, which has been updated from FIG. 6A.

Figure 6C:
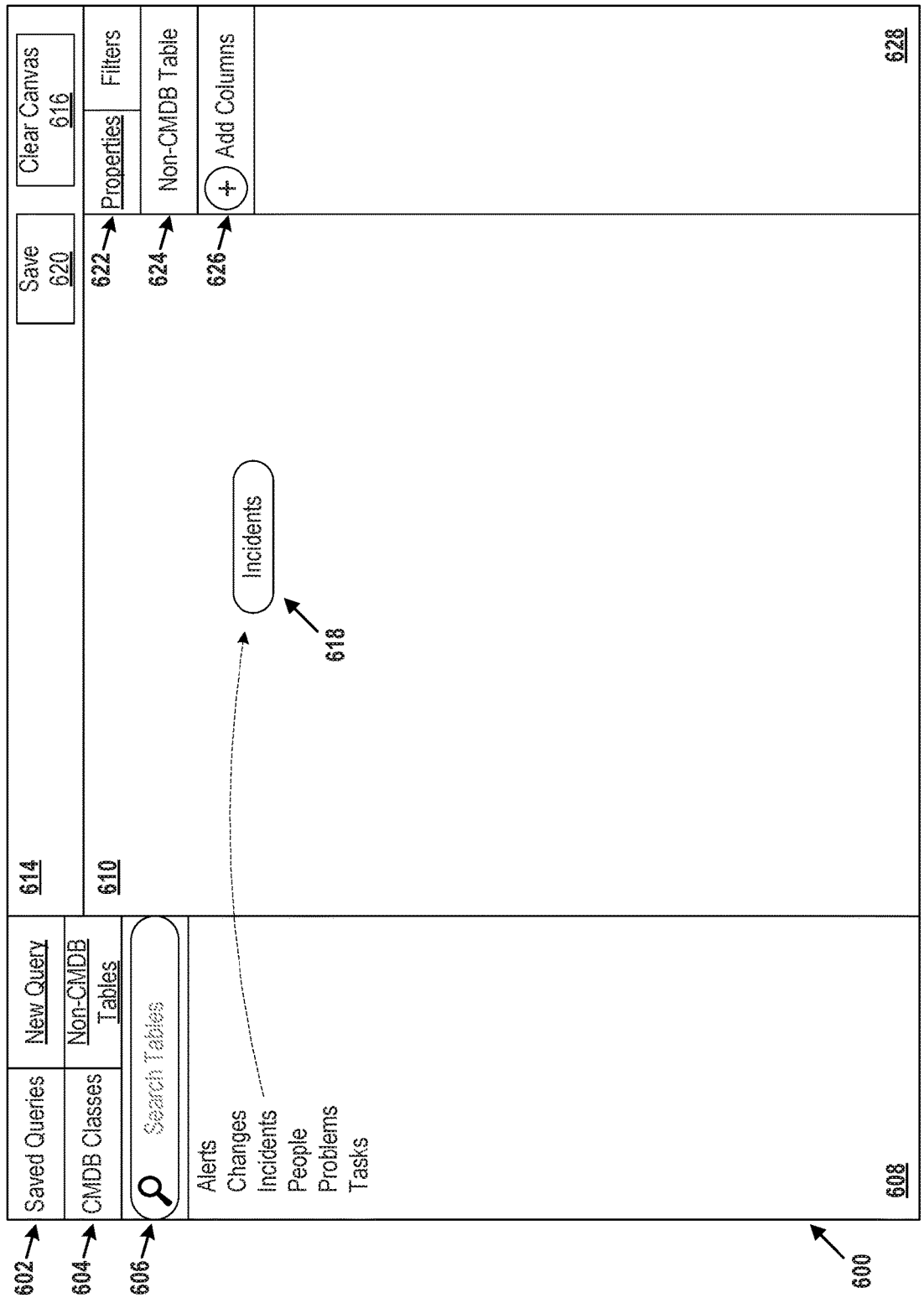
FIG. 6C depicts a search query operand being dragged to the canvas of a search query builder graphical user interface, in accordance with example embodiments.
Figure 6D:
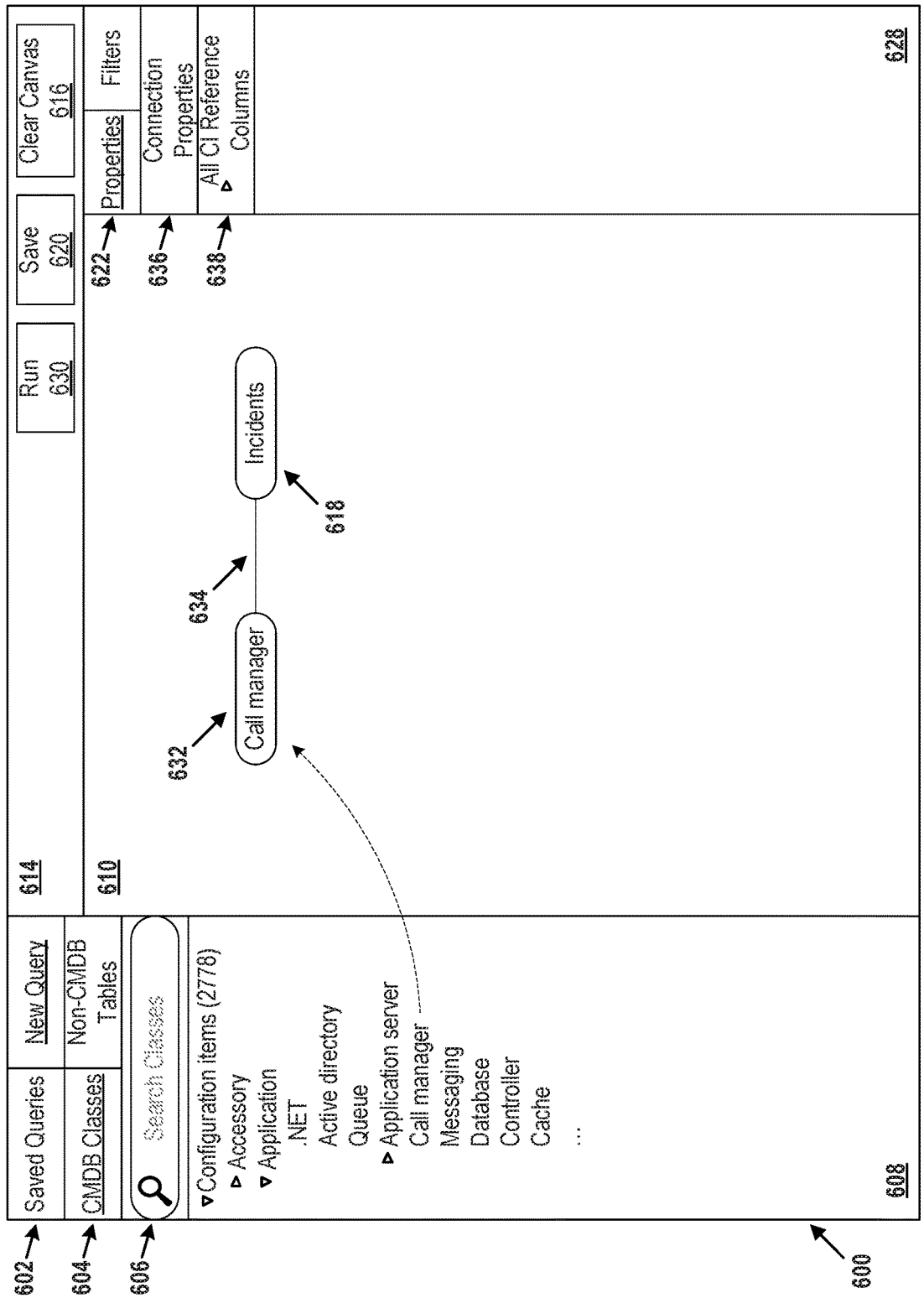
FIG. 6D depicts another view of the search query operand being dragged to the canvas of a search query builder graphical user interface, in accordance with example embodiments.

To that point, FIGS. 6C and 6D depict dragging and dropping of representations non-CMDB tables and configuration item classes onto canvas 610, respectively. FIG. 6C depicts the incidents table being selected and dragged from menu pane 608 to canvas 610. Doing so may cause the incidents table to be represented as pill 618 (e.g., a pill may be a draggable GUI element with an oblong shape and descriptive text appearing therein). When released on canvas 610, pill 618 may be automatically placed based on the presence and arrangement of other items on canvas 610. In this case, canvas 610 is otherwise empty, so pill 618 is centered toward the top of canvas 610. The user may be able to move pill 618 about canvas 610, for example, by selecting, dragging, and dropping.

FIG. 6C also depicts save button 620. When selected, this button may cause the graphical search query shown on canvas 610 to be saved to persistent storage. Search queries saved in this fashion may be loaded at a later time for further editing and/or execution, perhaps by way of the search query tab.

FIG. 6C further depicts selection pane 628, which contains tabs 622, indicator 624, and add columns widget 626. Tabs 622 are selectable to control options for displaying either indicator 624 and add columns widget 626 (when the properties tab is selected) or potentially other information (when the filters tab is selected). Indicator 624 specifies that the context for selection pane 628 is a non-CMDB table (i.e., the incidents table), and add columns widget 626 allows the user to select one or more columns of this non-CMDB table to display in the query results when this search query is executed. FIGS. 6G and 6J depict query results, though without any additional selected columns for the non-CMDB table.

The filters tab may be used to specify a filter expression to be applied to one or more columns of the non-CMDB table. For example, the user may specify a filter so that only incidents with the highest severity (e.g., P1) and an owner of the incident with a particular name (e.g., "John Smith") are to be considered in a subsequent search. The filters tab is not shown explicitly in the figures, but these filter expressions can be Boolean, algebraic, and/or numerical expressions of various lengths.

FIG. 6D depicts dragging and dropping a representation of a configuration item class onto canvas 610. The depiction of FIG. 6D may be reached after the events depicted in FIG. 6C occur.

Thus, the user may select CMDB classes from sub-tabs 604 and then select, drag, and drop the call manager class onto canvas 610. This may cause the call manager class to be represented as pill 632. When released on canvas 610, pill 632 may be automatically placed based on the presence and arrangement of other items on canvas 610. In this case, pill 632 is vertically aligned with pre-existing pill 618. In some embodiments, connection 634 between pill 632 and incidents 618 may be automatically created. This connection represents a search query. Alternatively, connection 634 can be manually or automatically added later.

Notably, connection properties indicator 636 presents drop-down menu 638 for selection of the properties of connection 634. In FIG. 6D, the latter has a default menu item of all configuration item (CI) reference columns selected. This arrangement means that canvas 610 contains a graphical representation of a search query that returns all configuration items that are: (i) of the class call manager, and (ii) referred to by any column in the incidents table that could potentially contain a reference to the configuration item.

In particular, a non-CMDB table may contain a number of columns. Some of these columns may contain references to configuration items (such as a unique identifier of a configuration item), while others typically do not. Thus, the columns available for selection by way of drop-down menu 638 may vary based on the selected non-CMDB table. As shown in FIG. 6D, drop-down menu 638 indicates that any of the columns that may contain references to configuration items will be considered in the search query.

Figure 6E:
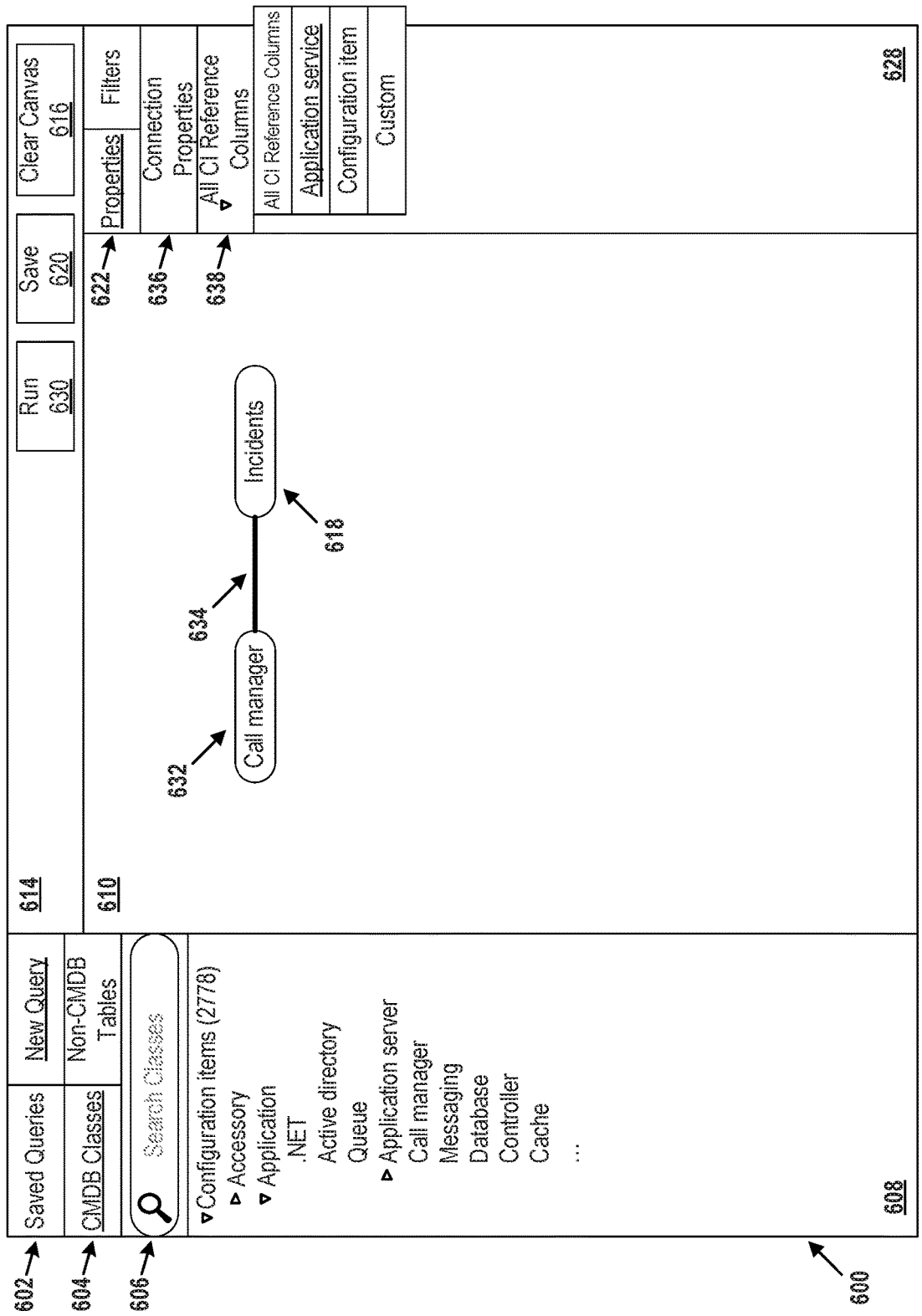
FIG. 6E depicts establishment of a relationship between search query operands in a search query builder graphical user interface, in accordance with example embodiments.
Figure 6F:
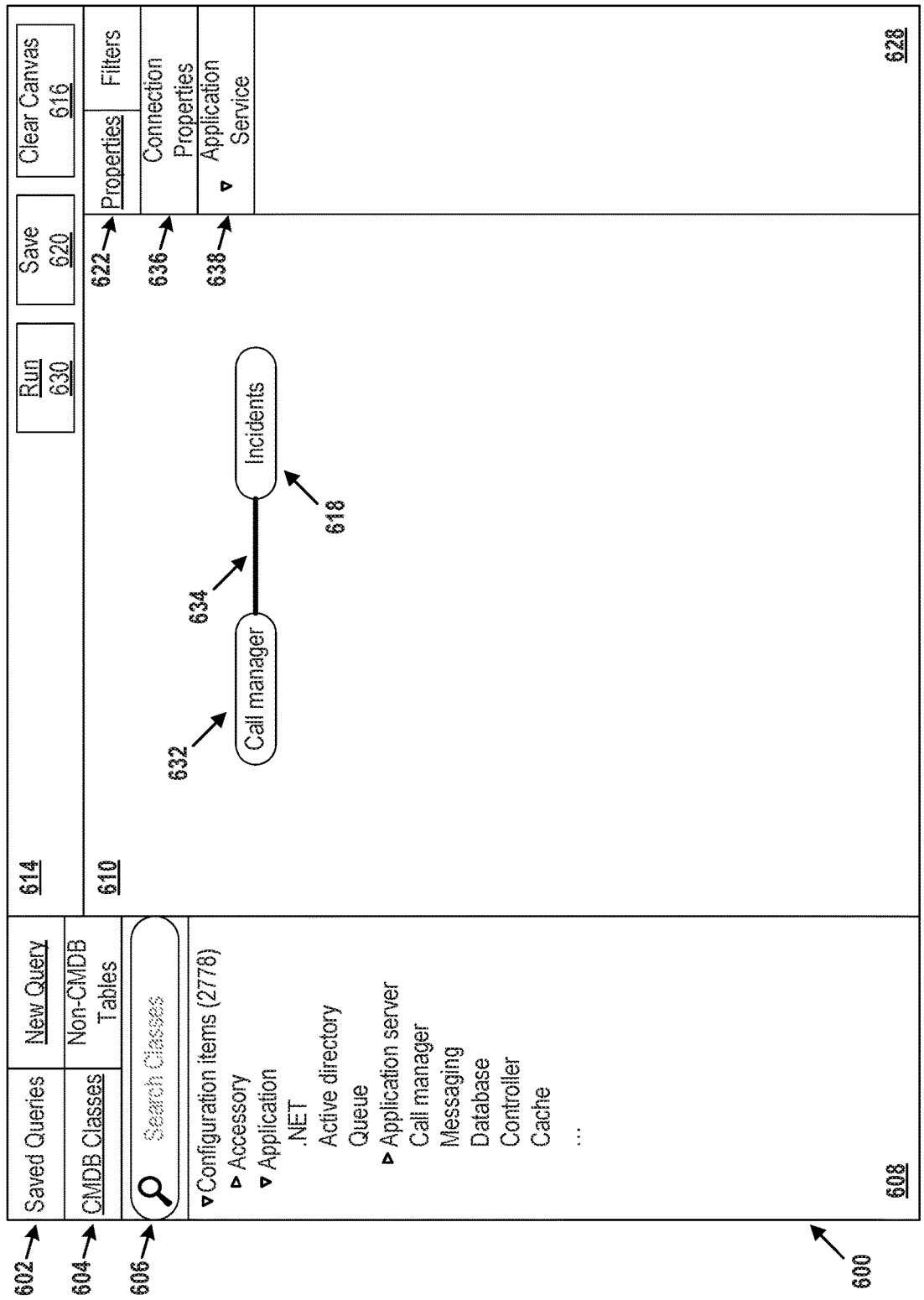
FIG. 6F depicts further establishment of a relationship between search query operands in a search query builder graphical user interface, in accordance with example embodiments.

FIG. 6E depicts this selection being changed. Drop-down menu 638 has been selected and shows additional options for application service, configuration item, and custom columns. In FIG. 6E, the application service column is selected, and FIG. 6F depicts GUI 600 with this selection made. This arrangement means that, in FIG. 6F, canvas 610 contains a graphical representation of a search query—namely, a search query that returns all configuration items that are: (i) of the class call manager, and (ii) referred to by the application service column of the incidents table.

FIG. 6F also depicts run button 630 being selected. This may cause the search query represented by the GUI elements on canvas 610 to be performed.

FIG. 6G depicts the results of such a search query in GUI 650. These results are displayed in rows 654, 656, and 658. Header row 652 provides headers describing the properties of each column. As suggested earlier, the columns to be displayed in query results such as these may be defined by the user by way of add columns widget 626, for example.

In GUI 650, the columns displayed are for the call manager, the call manager/incident type, and incidents. The call manager column refers to the name of the specific call manager configuration item or software found by the search. The call manager/incident type column refers to the type of reference between the call manager and the associated incident. In other words, the call manager/incident type refers to the properties of connection 634. The incidents column specifies the unique incident number found by the search that references a configuration item of type call manager and having the aforementioned properties.

In other words, row 654 indicates that a MyPhone configuration item of class call manager is referred to by an application service reference in incident INC1134141. Similarly, row 656 indicates that a MyPhone configuration item of class call manager is referred to by an application service reference in incident INC1134149. Likewise, row 658 indicates that an ABC Messenger configuration item of class call manager is referred to by an application service reference in incident INC1134157.

Selecting any of the check boxes to the left of rows 654, 656, and 658 may result in a checkmark appearing in the selected check box and the associated row being selected for further processing. Selecting the check box to the left of row 652 may result in checkmarks appearing in the all check boxes and all rows being selected for further processing. To that end, drop-down menu 660 may facilitate this further processing on the rows with checkmarks. Such further processing may involve displaying information related to the selected query result(s), such as the identified configuration item(s), incident(s), and/or the connection therebetween.

Navigation bar 662 may facilitate paging through query results that span multiple pages (where a "page" represents a pre-configured number of queries to be displayed at a time). As shown, navigation bar 662 indicates that at most 10 rows per page of query results will be displayed, and also contains left and right arrows to flip between pages of query results.

Nonetheless, the search results of FIG. 6G may be displayed in different ways. Other information and arrangements thereof may be presented.

In addition to the utility and improvements provided by the graphical query builder features described so far, search queries involving multiple configuration item classes and/or multiple non-CMDB tables can be formed using Boolean operators. If multiple Boolean operators are used in a search query, their precedence may be from left to right, for example.

Figure 6H:
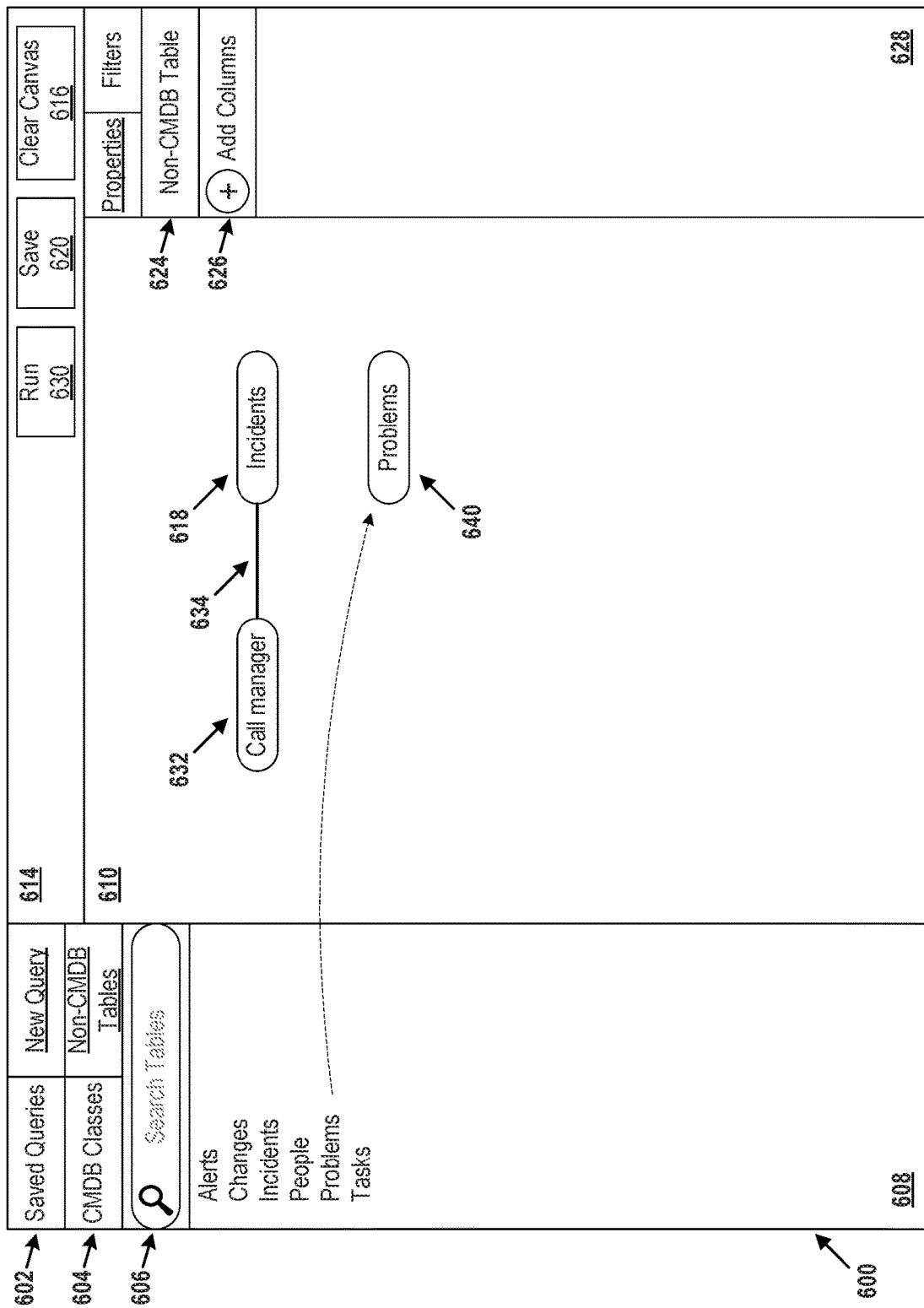
FIG. 6H depicts yet another search query operand being dragged to the canvas of a search query builder graphical user interface, in accordance with example embodiments.

FIG. 6H (which continues from the example of FIG. 6F) depicts the problems table being selected and dragged from menu pane 608 to canvas 610. Doing so may cause the problems table to be represented as pill 640. When released on canvas 610, pill 640 may be automatically placed based on the presence and arrangement of other items on canvas 610. In this case, canvas 610 contains other pills with a connection therebetween, so pill 640 is placed in a different location on canvas 610 until a further connection between pill 640 and the other pills is established. The user may be able to move pill 640 about canvas 610, for example, by selecting, dragging, and dropping.

Figure 6I:
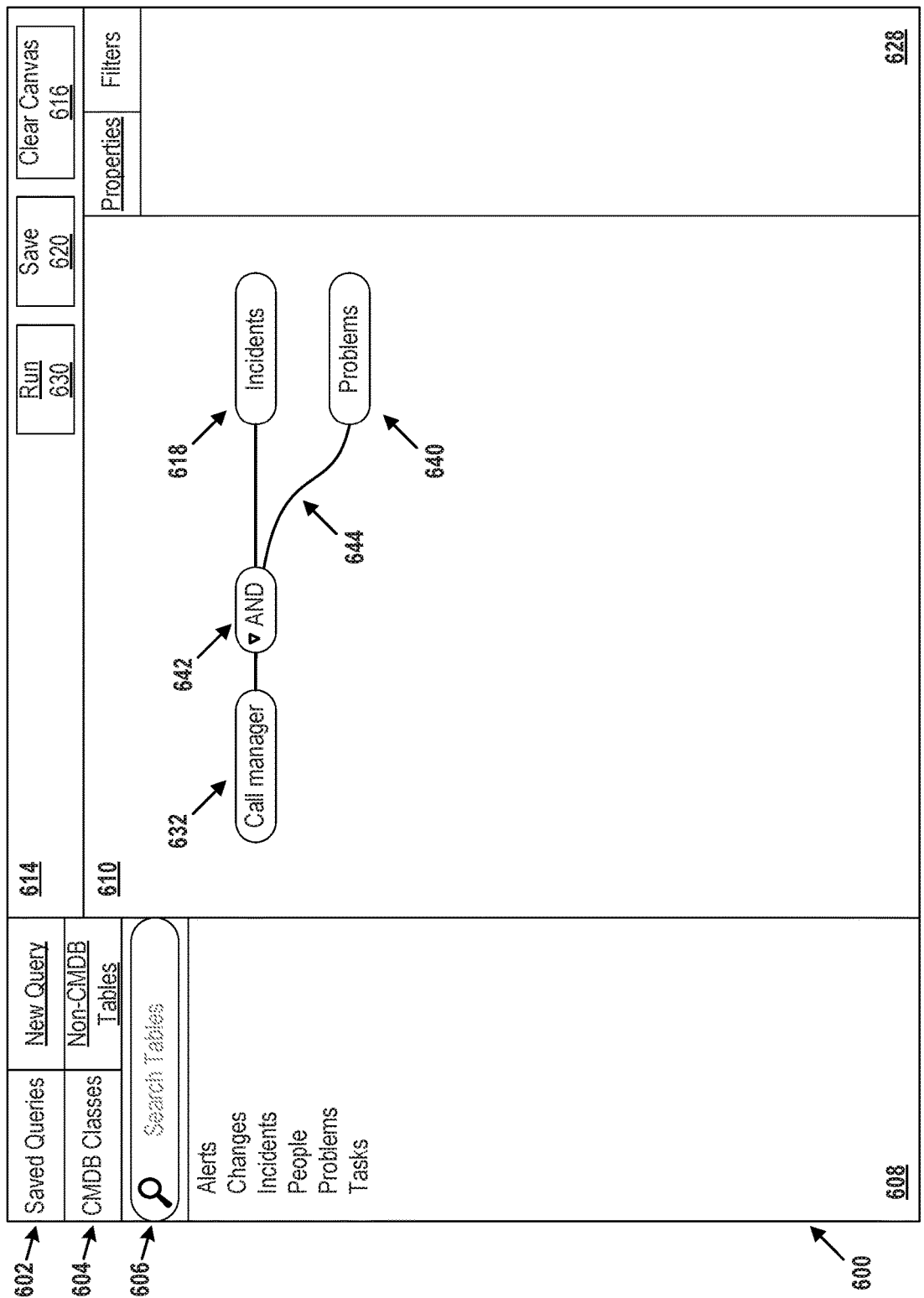
FIG. 6I depicts further establishment of a relationship between search query operands in a search query builder graphical user interface, in accordance with example embodiments, in accordance with example embodiments.
Figure 6J:
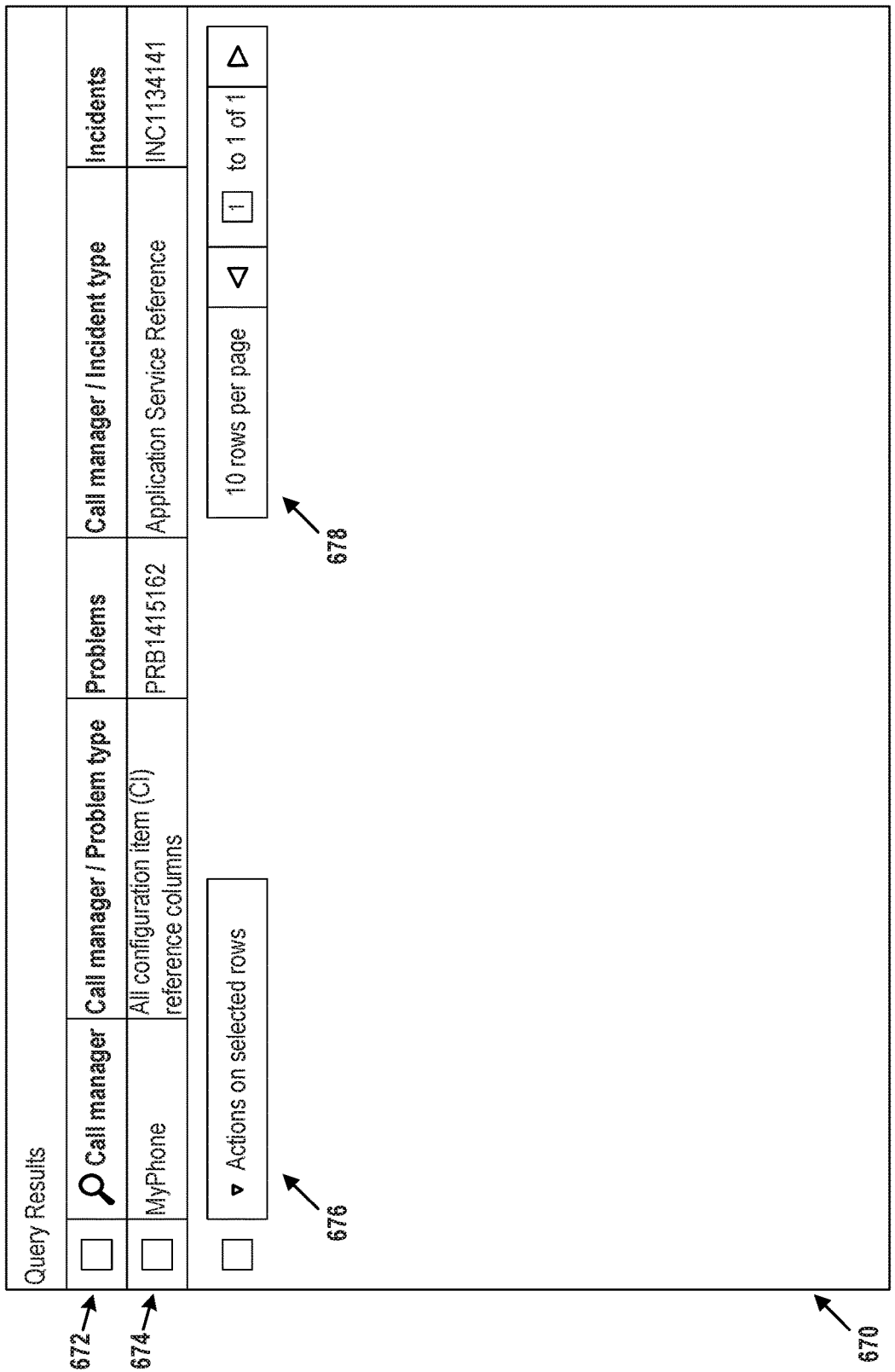
FIG. 6J depicts another search query results graphical user interface, in accordance with example embodiments.

Continuing from the example of FIG. 6H, FIG. 6I depicts GUI 600 with pill 640 connected to pill 632 and pill 618 by logical "and" operator 642. As was the case for connection 634, one or more columns of the table associated with pill 640 can be selected for connection 644 in order to specify which columns should be considered as possibly containing a reference to a configuration item. The selection of one or more such columns is skipped in the figures for purposes of simplicity, but is assumed to have been performed and resulted in the menu item of all configuration item (CI) reference columns selected.

Operator 642 is depicted as a logical "and" operator. The drop-down arrow on the left of operator 642 may be selected to display a menu of possible Boolean operators in addition to "and", such as "or", "xor", and "not". As displayed, the search query of FIG. 6I returns all configuration items that are: (i) of the class call manager, (ii) referred to by the application service column of the incidents table, and (iii) referred to by any column in the problems table that could potentially contain a reference to the configuration item.

FIG. 6J depicts the results of such a search query in GUI 670. These results are displayed in row 674. In this case, a single result was returned, but in other situations, multiple results could be returned and displayed in a fashion that is similar to that of FIG. 6G. Header row 672 provides headers describing the properties of each column.

In GUI 670, the columns displayed are for the call manager, the call manager/problem type, problems, the call manager/incident type, and incidents. The call manager column refers to the name of the specific call manager configuration item or software found by the search. The call manager/problem type column refers to the type of reference between the call manager and the associated incident. In other words, the call manager/problem type refers to the properties of connection 634. The problems column specifies the unique problem number found by the search that references a configuration item of type call manager and having the properties of connection 634. The call manager/incident type column refers to the type of reference between the call manager and the associated incident. The incidents column specifies the unique incident number found by the search that references a configuration item of type call manager and having the aforementioned properties of connection 634.

Thus, the search result shown in FIG. 6J indicates that there is only one configuration item in the CMDB that is associated in the respectively specified fashions with a problem and an incident. In other words, row 674 indicates that a MyPhone configuration item of class call manager is referred to by at least one of the configuration item reference columns of problem PRB1415162 and by an application service reference column in incident INC1134141.

Selecting the check box to the left of row 674 may result in a checkmark appearing in the selected check box and row 674 being selected for further processing. Selecting the check box to the left of row 672 may result in checkmarks appearing in the all check boxes and all rows (in this case just row 674) being selected for further processing. To that end, drop-down menu 676 may facilitate this further processing on the rows with checkmarks. This further processing may involve displaying information related to the selected query result(s), such as the identified configuration item(s), problem(s), incident(s), and/or the connection therebetween.

Navigation bar 678 may facilitate paging through query results that span multiple pages (where a "page" represents a pre-configured number of queries to be displayed at a time). As shown, navigation bar 678 indicates that at most 10 rows per page of query results will be displayed, and also contains left and right arrows to flip between pages of query results.

Nonetheless, the search results of FIG. 6J may be displayed in different ways. Other information and arrangements thereof may be presented.

As briefly discussed above, GUI elements (such as save button 620) may be present that allow the saving/exporting of search queries and/or query results. The save/export format may be XML for example. These saved/exported search queries and/or query results may also be loaded/imported back into GUI 600 or GUI 650 by additional GUI elements. As one possible example, saved/exported search queries may be available by way of the saved queries tab of tabs 602.

VI. Example Operations

Figure 7:
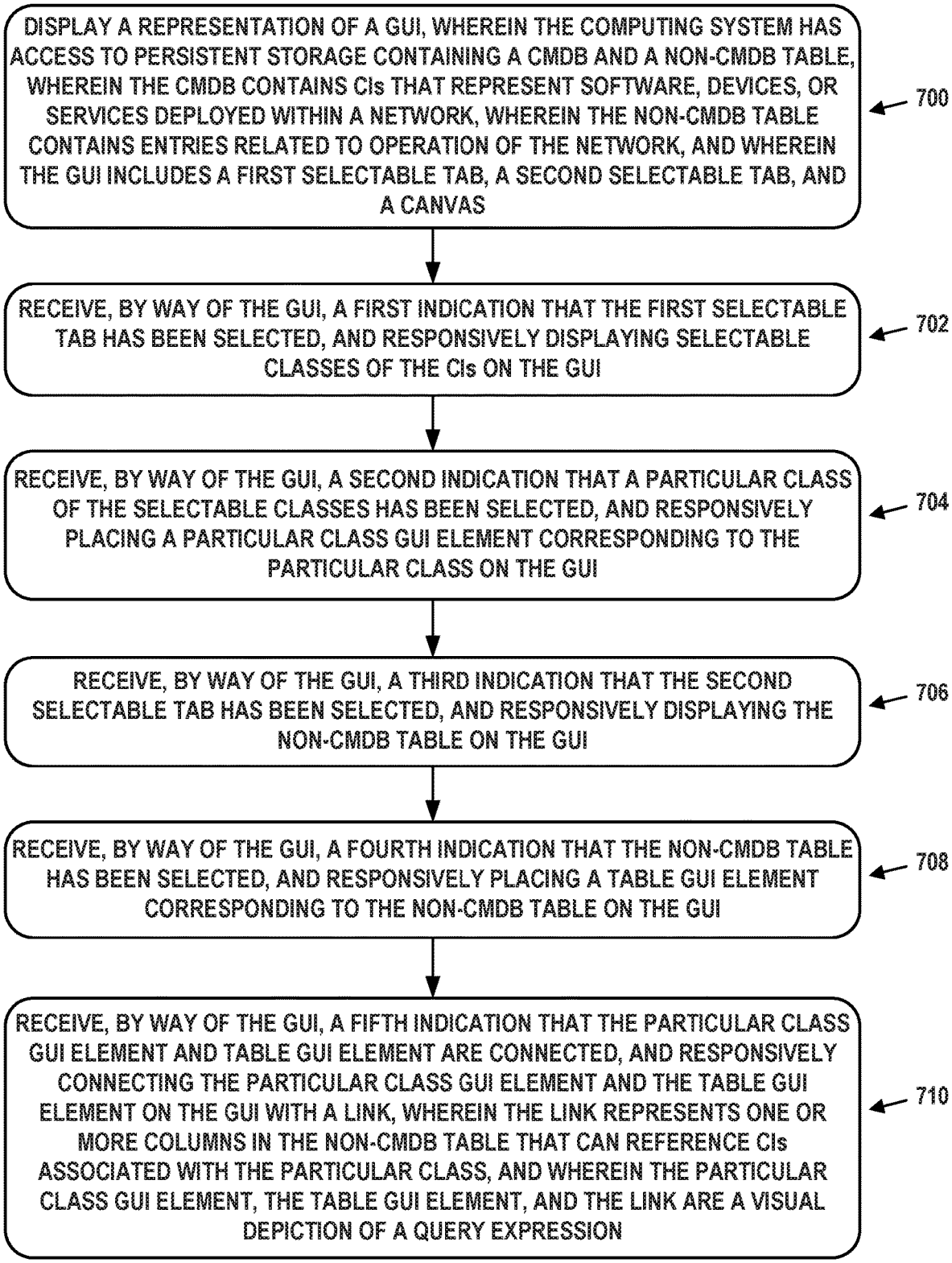
FIG. 7 is a flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 may involve displaying a representation of a GUI, where persistent storage contains a CMDB and a non-CMDB table, where the CMDB contains CIs that represent software, devices, or services deployed within a network, where the non-CMDB table contains entries related to operation of the network, and where the GUI includes a first selectable tab, a second selectable tab, and a canvas.

Block 702 may involve receiving, by way of the GUI, a first indication that the first selectable tab has been selected, and responsively displaying selectable classes of the CIs on the GUI.

Block 704 may involve receiving, by way of the GUI, a second indication that a particular class of the selectable classes has been selected, and responsively placing a particular class GUI element corresponding to the particular class on the GUI.

Block 706 may involve receiving, by way of the GUI, a third indication that the second selectable tab has been selected, and responsively displaying the non-CMDB table on the GUI.

Block 708 may involve receiving, by way of the GUI, a fourth indication that the non-CMDB table has been selected, and responsively placing a table GUI element corresponding to the non-CMDB table on the GUI.

Block 710 may involve receiving, by way of the GUI, a fifth indication that the particular class GUI element and table GUI element are connected, and responsively connecting the particular class GUI element and the table GUI element on the GUI with a link, where the link represents one or more columns in the non-CMDB table that can reference CIs associated with the particular class, and where the particular class GUI element, the table GUI element, and the link are a visual depiction of a query expression.

In some embodiments, the persistent storage also contains a second non-CMDB table, and the second selectable tab also displays the second non-CMDB table. The embodiments may further involve: (i) receiving, by way of the GUI, a sixth indication that the second non-CMDB table has been selected, and responsively placing a second table GUI element corresponding to the second non-CMDB table on the GUI; and (ii) receiving, by way of the GUI, a seventh indication that the particular class GUI element and second table GUI element are connected, and responsively connecting the particular class GUI element and the second table GUI element on the GUI with a second link, where the second link represents one or more columns in the second non-CMDB table that can reference CIs associated with the particular class. The link and the second link may be associated, on the GUI, with an operator GUI element, where the operator GUI element depicts a Boolean operator. The operator GUI element may include a drop-down menu that represents two or more selectable Boolean operators for assignment to the operator GUI element.

In some embodiments, the one or more columns in the non-CMDB table are selectable by way of a drop-down menu of the GUI.

In some embodiments, the GUI also contains a selectable control. These embodiments may further involve receiving, by way of the GUI, a sixth indication that the selectable control has been selected, and responsively querying the CMDB and the non-CMDB table for a set of CIs that are: (i) of the particular class, and (ii) referenced by at least one of the entries in the one or more columns. Additionally, these embodiments may also involve displaying, by client device, a second representation of a second GUI, where the second GUI displays the set of CIs in a tabular form, one CI per row of the tabular form, and where the columns of the tabular form include representations of the particular class and the non-CMDB table.

In some embodiments, the GUI also contains a selectable control that, when selected, causes the query expression to be saved to the persistent storage.

In some embodiments, the one or more columns in the non-CMDB table that can reference CIs associated with the particular class GUI element are selectable from a drop-down menu by type of reference.

In some embodiments, the classes of the CIs are displayed within a hierarchy thereof, and selectable controls on the GUI, when selected, cause corresponding sub-classes of the CIs to collapse or expand.

In some embodiments, the persistent storage is disposed within a computational instance of a remote network management platform, and the computational instance is associated with the network.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing a configuration management database (CMDB) and a non-CMDB table, wherein the CMDB contains configuration items (CIs) that represent software, devices, or services deployed within a network, and wherein the non-CMDB table contains entries related to operation of the network; and
   one or more processors configured to provide, to a client device associated with the network, a representation of a graphical user interface (GUI),
   wherein the GUI contains a first selectable tab that displays classes of the CIs, a second selectable tab that displays the non-CMDB table, and a canvas for visually depicting query expressions,
   wherein the classes are selectable, when displayed and by way of the GUI, to place class GUI elements thereof onto the canvas,
   wherein the non-CMDB table is selectable, when displayed and by way of the GUI, to place a table GUI element thereof onto the canvas,
   wherein the table GUI element and a particular class GUI element of the class GUI elements are connectable by a link on the canvas when displayed thereon, and
   wherein the link represents one or more columns in the non-CMDB table that can reference CIs associated with a particular class corresponding to the particular class GUI element.

2. The system of claim 1, wherein the persistent storage also contains a second non-CMDB table,
   wherein the second selectable tab also displays the second non-CMDB table,
   wherein the second non-CMDB table is selectable, when displayed and by way of the GUI, to place a second table GUI element thereof onto the canvas,
   wherein the second table GUI element and the particular class GUI element are connectable by a second link on the canvas when displayed thereon, and
   wherein the second link represents one or more columns in the second non-CMDB table that can reference the CIs associated with the particular class.

3. The system of claim 2, wherein the link and the second link are associated, on the GUI, with an operator GUI element, wherein the operator GUI element depicts a Boolean operator.

4. The system of claim 3, wherein the operator GUI element includes a drop-down menu that represents two or more selectable Boolean operators for assignment to the operator GUI element.

5. The system of claim 1, wherein the one or more columns in the non-CMDB table are selectable by way of a drop-down menu of the GUI.

6. The system of claim 1, wherein the GUI also contains a selectable control that, when selected, causes the one or more processors to:
   query the CMDB and the non-CMDB table for a set of CIs that are: (i) of the particular class, and (ii) referenced by at least one of the entries in the one or more columns; and
   in response to the query, obtain the set of CIs.

7. The system of claim 6, wherein the one or more processors are further configured to provide, to the client device, a second representation of a second GUI, wherein the second GUI displays the set of CIs in a tabular form, one CI per row of the tabular form, and wherein the columns of the tabular form include representations of the particular class and the non-CMDB table.

8. The system of claim 1, wherein the GUI also contains a selectable control that, when selected, causes a query expression represented by the table GUI element, the particular class GUI element, and the link to be saved to the persistent storage.

9. The system of claim 1, wherein the classes of the CIs are displayed within a hierarchy thereof, and wherein selectable controls on the GUI, when selected, cause corresponding sub-classes of the CIs to collapse or expand.

10. The system of claim 1, wherein the one or more columns in the non-CMDB table that can reference CIs associated with the particular class GUI element are selectable from a drop-down menu by type of reference.

11. The system of claim 1, wherein the persistent storage is disposed within a computational instance of a remote network management platform, wherein the computational instance is associated with the network.

12. A computer-implemented method comprising:
displaying, by a client device associated with a network, a representation of a graphical user interface (GUI), wherein the client device has access to persistent storage containing a configuration management database (CMDB) and a non-CMDB table, wherein the CMDB contains configuration items (CIs) that represent software, devices, or services deployed within the network, wherein the non-CMDB table contains entries related to operation of the network, and wherein the GUI includes a first selectable tab, a second selectable tab, and a canvas;
receiving, by way of the GUI, a first indication that the first selectable tab has been selected, and responsively displaying selectable classes of the CIs on the GUI;
receiving, by way of the GUI, a second indication that a particular class of the selectable classes has been selected, and responsively placing a particular class GUI element corresponding to the particular class on the GUI;
receiving, by way of the GUI, a third indication that the second selectable tab has been selected, and responsively displaying the non-CMDB table on the GUI;
receiving, by way of the GUI, a fourth indication that the non-CMDB table has been selected, and responsively placing a table GUI element corresponding to the non-CMDB table on the GUI; and
receiving, by way of the GUI, a fifth indication that the particular class GUI element and table GUI element are connected, and responsively connecting the particular class GUI element and the table GUI element on the GUI with a link, wherein the link represents one or more columns in the non-CMDB table that can reference CIs associated with the particular class, and wherein the particular class GUI element, the table GUI element, and the link are a visual depiction of a query expression.

13. The computer-implemented method of claim 12, wherein the persistent storage also contains a second non-CMDB table, and wherein the second selectable tab also displays the second non-CMDB table, the computer-implemented method further comprising:
receiving, by way of the GUI, a sixth indication that the second non-CMDB table has been selected, and responsively placing a second table GUI element corresponding to the second non-CMDB table on the GUI; and
receiving, by way of the GUI, a seventh indication that the particular class GUI element and second table GUI element are connected, and responsively connecting the particular class GUI element and the second table GUI element on the GUI with a second link, wherein the second link represents one or more columns in the second non-CMDB table that can reference CIs associated with the particular class.

14. The computer-implemented method of claim 13, wherein the link and the second link are associated, on the GUI, with an operator GUI element, wherein the operator GUI element depicts a Boolean operator.

15. The computer-implemented method of claim 12, wherein the one or more columns in the non-CMDB table are selectable by way of a drop-down menu of the GUI.

16. The computer-implemented method of claim 12, wherein the GUI also contains a selectable control, the computer-implemented method further comprising:
receiving, by way of the GUI, a sixth indication that the selectable control has been selected, and responsively querying the CMDB and the non-CMDB table for a set of CIs that are: (i) of the particular class, and (ii) referenced by at least one of the entries in the one or more columns.

17. The computer-implemented method of claim 16, further comprising:
displaying, by client device, a second representation of a second GUI, wherein the second GUI displays the set of CIs in a tabular form, one CI per row of the tabular form, and wherein the columns of the tabular form include representations of the particular class and the non-CMDB table.

18. The computer-implemented method of claim 12, wherein the GUI also contains a selectable control that, when selected, causes the query expression to be saved to the persistent storage.

19. The computer-implemented method of claim 12, wherein the one or more columns in the non-CMDB table that can reference CIs associated with the particular class GUI element are selectable from a drop-down menu by type of reference.

20. An article of manufacture including a non-transitory computer-readable medium, having stored thereon program instructions that, upon execution by a computing system, cause the computing system to perform operations comprising:
displaying a representation of a graphical user interface (GUI), wherein the computing system has access to persistent storage containing a configuration management database (CMDB) and a non-CMDB table, wherein the CMDB contains configuration items (CIs) that represent software, devices, or services deployed within a network, wherein the non-CMDB table contains entries related to operation of the network, and wherein the GUI includes a first selectable tab, a second selectable tab, and a canvas;
receiving, by way of the GUI, a first indication that the first selectable tab has been selected, and responsively displaying selectable classes of the CIs on the GUI;
receiving, by way of the GUI, a second indication that a particular class of the selectable classes has been selected, and responsively placing a particular class GUI element corresponding to the particular class on the GUI;
receiving, by way of the GUI, a third indication that the second selectable tab has been selected, and responsively displaying the non-CMDB table on the GUI;
receiving, by way of the GUI, a fourth indication that the non-CMDB table has been selected, and responsively placing a table GUI element corresponding to the non-CMDB table on the GUI; and
receiving, by way of the GUI, a fifth indication that the particular class GUI element and table GUI element are connected, and responsively connecting the particular class GUI element and the table GUI element on the GUI with a link, wherein the link represents one or more columns in the non-CMDB table that can reference CIs associated with the particular class, and wherein the particular class GUI element, the table GUI element, and the link are a visual depiction of a query expression.

\* \* \* \* \*